UNITED STATES PATENT OFFICE.

MAURICE AHERN, OF LONDON, ENGLAND.

COMPOSITION FOR ENAMELING BRICKS, &c.

SPECIFICATION forming part of Letters Patent No. 545,757, dated September 3, 1895.

Application filed April 6, 1895. Serial No. 544,811. (No specimens.) Patented in England June 26, 1894, No. 12,383; in Belgium April 3, 1895, No. 114,900; in Luxemburg April 3, 1895, No. 2,270, and in Canada June 5, 1895, No. 49,123.

*To all whom it may concern:*

Be it known that I, MAURICE AHERN, a citizen of England, residing at Bounds Green, New Southgate, London, in the county of Middlesex, England, have invented new and useful Improvements in a Composition for Glazing and Enameling Bricks and the Like and Iron and other Metals, (for which I have obtained patents in the following countries: Great Britain, dated June 26, 1894, No. 12,383; Belgium, dated April 3, 1895, No. 114,900; Canada, dated June 5, 1895, No. 49,123, and Luxemburg, dated April 3, 1895, No. 2,270,) of which the following is a specification.

My invention relates to a composition of materials and modes of applying such composition for the purpose of glazing or enameling bricks and the like; also, iron or other metal.

I mix together pulverized arsenic glass and broken or waste ceramic material, along with various proportions of alkaline carbonates and nitrates; also, small proportions of tin, lead, and bismuth powders. Reducing this mixture to a fine powder, I spread it evenly on the surface of bricks before they are compressed, so that it is well incorporated with the surface of the bricks and forms a white glaze or enamel on them when they are burned.

For applying the composition to iron or other metal I prefer, first, to fuse the mixture. Then, having granulated it by pouring the melted mass into water, I reduce it to a fine powder, which I make up with water and preferably with a suitable thickening-vehicle—such as gum, sugar, or the like—to the condition of a paint, which I spread over the metal with a brush or otherwise. On heating the metal so as to fuse the material painted on it, this forms a glaze or enamel on the surface. When the glaze or enamel is to be colored, I add to the composition such metallic oxides or salts as will give the desired tints when baked.

The proportions of the ingredients of the glazing and enameling compositions may be varied within certain limits. I find the following proportions suitable to form the composition for glazing and enameling bricks: Arsenic glass, about sixty parts, by weight; broken china, about fourteen parts; carbonate of potash, about four parts; carbonate of soda, about five parts; lead, about two parts; tin, about one part, and bismuth, from one-half to one part. The same composition is applicable also for enameling metal; but for this purpose, as stated above, it is fined, granulated, pulverized, and made up with water and gum to the consistence of a paint, along with coloring-matter, if desired. The composition for enameling brick may be treated and applied in the same manner as that for metal.

The arsenic glass referred to generally consists of about six parts, by weight, of red lead, six parts silica, two parts carbonate of potash, and one part arsenious matters, these being fused together to form glass, as usual.

What I claim is—

1. A composition for glazing or enameling brick, pottery and metals, consisting of arsenic glass, ceramic material, alkalies, tin, lead, and bizmuth prepared and applied substantially as described.

2. A composition for glazing or enameling brick, pottery and metals, consisting of arsenic glass, ceramic material, alkalies, tin, lead and bizmuth all mixed and fused, then pulverized, and reduced to a paint like consistency by a suitable vehicle, as gum or sugar, substantially as and for the purpose specified.

In testimony whereof I have signed my name to this specification, in the presence of two subscribing witnesses, this 27th day of March, A. D. 1895.

MAURICE AHERN.

Witnesses:
 OLIVER IMRAY,
 JNO. P. M. MILLARD.